United States Patent
Yoffe et al.

(10) Patent No.: US 12,436,625 B2
(45) Date of Patent: Oct. 7, 2025

(54) COMPUTER MOUSE WITH BOTTOM SURFACE RESISTANCE POINT FOR PRECISION MOVEMENTS

(71) Applicants: Simon Yoffe, Manhattan, NY (US); David Yoffe, Modiin (IL)

(72) Inventors: Simon Yoffe, Manhattan, NY (US); David Yoffe, Modiin (IL)

(*) Notice: Subject to any disclaimer, the term of this patent is extended or adjusted under 35 U.S.C. 154(b) by 0 days.

(21) Appl. No.: 18/473,213

(22) Filed: Sep. 23, 2023

(65) Prior Publication Data
US 2024/0019944 A1    Jan. 18, 2024

Related U.S. Application Data

(63) Continuation of application No. 17/746,297, filed on May 17, 2022, now Pat. No. 11,874,973.

(51) Int. Cl.
G06F 3/0354    (2013.01)
G06F 3/039     (2013.01)

(52) U.S. Cl.
CPC ........ G06F 3/03543 (2013.01); G06F 3/0395 (2013.01)

(58) Field of Classification Search
CPC .................. G06F 3/03543; G06F 3/0395
USPC ............................................. 345/163
See application file for complete search history.

(56) References Cited

U.S. PATENT DOCUMENTS

| | | | |
|---|---|---|---|
| 7,006,077 B1* | 2/2006 | Uusimaki | G06F 1/1662 345/173 |
| 2002/0021277 A1* | 2/2002 | Kramer | G06F 3/016 345/156 |
| 2007/0069088 A1* | 3/2007 | Bidiville | G06F 3/03543 248/188.9 |
| 2013/0194183 A1* | 8/2013 | Odgers | G06F 1/162 345/158 |
| 2015/0193023 A1* | 7/2015 | Odgers | G06F 3/0483 345/163 |
| 2019/0155477 A1* | 5/2019 | Busby | G06F 3/03543 |

* cited by examiner

*Primary Examiner* — Mark Edwards

(57) ABSTRACT

A computer mouse including a base with bottom surface equipped with cushion members with slid-able sheets configured for sliding across the working surfaces and a tip with a base, which can be placed on the bottom surface or penetrate the bottom surface, where the base is not extended beyond the cushion members to avoid touching the working surfaces, and the tip is extended beyond the cushion members to provide a resistance point during mouse movement over the working surface, wherein the resistance point provides precise movement of the mouse over the work surface without affecting the position and navigation of the pointer on a computer screen.

20 Claims, 5 Drawing Sheets

COMPUTER MOUSE WITH BOTTOM SURFACE RESISTANCE POINT FOR PRECISION MOVEMENTS

BACKGROUND OF THE INVENTION

For many computer users the conventional mouse is not good enough for tasks that require precision movements. Tasks like electronic signature, drawing with graphical editors or computer aided design programs; some games require switching between tasks that require different level of precision. Conventional mouse is designed for good sliding over the surface with small effort, different improvements were done for convenient holding in hand and ergonomic use. Computer mouse pads improved mouse movements, but no improvements can reach level of precision that humans can reach with simple pen.

The proposed invention introduces a resistance point at the middle part of the mouse's bottom surface, positioned beneath the user's palm, to enhance movement precision. An activation button, raised above the mouse body for convenience, allows the user to create resistance by gently lowering their palm, freeing their fingers for other tasks. A permanent resistance point can also be established by attaching a flat base with a tip to the middle part of the mouse's bottom surface, positioned between cushion members with slid-able sheets. The base's thickness matches or is less than the extension of the slid-able sheets over the primary bottom surface, while the tip extends beyond the slid-able sheets.

This invention introduces the concept of a flat base with a tip, distinct from prior art such as U.S. Pat. No. 5,678,800, which focuses on inclined surfaces in mouse pads, or U.S. Pat. No. 4,797,665, which deals with slid-able sheets and cushion members but differs in shape and purpose. Additionally, the invention caters to users who prefer activating the resistance point with their fingers by placing the activation button at various locations on the mouse body, connected to the movement mechanism via a pull-push rod or an air pipe.

PRIOR ART

Computer mouse pad having inclined surfaces, U.S. Pat. No. 5,678,800
Computer mouse, United States Patent Application 20120319955
Computer mouse structure, U.S Pat. No. 5,790,098.
Silent mouse, U.S. Pat. No. 8,248,368
Silent mouse, United States Patent Application 20100117964
X-Y position input device, U.S. Pat. No. 4,797,665
Mouse device, United States Patent Application 20180329525
Computer mouse, United States Patent Application 20190391673.
Computer mouse, U.S. Pat. No. 10,719,141.
Computer mouse, U.S. Pat. No. 11,409,378
Computer mouse, United States Patent Application 20210303086
Force-sensing mouse pointing device for computer input, United States Patent Application 20040080494
Force-sensing mouse pointing device for computer input, United States Patent Application 20090289897
Mouse with a detachable operating module, United States Patent Application 20130169538
Overload-protection push-button switch with automatic resetting mechanism of pull-push type, U.S. Pat. No. 6,445,275.
Pneumatic-electrical control device, U.S. Pat. No. 5,539,166

SUMMARY OF THE INVENTION

A computer mouse including a base with bottom surface cushion members with slid-able sheets configured for sliding across the working surfaces.

A tip with a base, which can be placed on the bottom surface or penetrate the bottom surface, where the base is not extended beyond the cushion members to avoid touching the working surface, and the tip is extended beyond the cushion members to provide a resistance point during mouse movement over the working surface, wherein the resistance point provides precise movement of the mouse over the work surface without affecting the position and navigation of the pointer on a computer screen. A movement detection sensor for measuring the computer mouse movement over the working surface and navigating a pointer to different directions.

The computer mouse also can incorporate a retrievable tip mechanism for the tip with a base. Upon activation, this mechanism retrieves the base with the tip, placing it on the bottom surface or allowing it to penetrate it to provide the desired resistance. An activation button may be included to facilitate the retrievable tip mechanism.

In some embodiments the activation button is specifically designed for ease of use as a palm button situated on the upper surface under the user's palm, enabling activation using the palm without the need for fingers. The palm button is raised or protrudes upwards over the upper surface to minimize the required palm movement for activation.

The palm button can have one side fixed to the mouse top while the other is flexible and raised over the top to allow pressing with the palm, and a button activation mechanism which can be placed in different locations between the two sides. The proximity of activation mechanism to the fixed side reduces its traveling distance from the palm press, allowing more granular control over the activation.

A computer mouse including a base with bottom surface cushion members with slid-able sheets configured for sliding across the working surfaces, where tip with a base is an external removable part that can be placed on the bottom surface or into a hollow housing unit extending from the bottom surface.

The tip with a base can be a part of a plug that can be placed into a hollow housing unit extending from the bottom surface. The hollow housing unit can be the USB dongle holder.

The tip with a base can be in the form of a sticker can be attached using adhesive to the bottom surface of mouse or on top of a plug that can be placed into a hollow housing unit extending from the bottom surface. Base of the tip can include a pressure sensor. Sensor should be flat; most useful types of sensor are a force-dependent resistor or RFID passive sensor tag.

Signals from the pressure sensor can have various applications, including security measures such as verifying that a human operator is using the computer mouse and providing additional verification for electronic signatures. The unique pressure patterns generated during the signature process are specific to each human operator and cannot be deduced solely from the electronic signature.

The retrievable tip mechanism further can have two parts, an activation button located on the upper surface and a movement mechanism connected to the retrievable tip mechanism. This when activation part can have placed at different locations at mouse body, connection to movement mechanism can be flexible since available inner space does not allow rigorous connection. A pull-push cable proving certain degree of flexibility, allowing activation button from front side of mouse moving tip at backside of mouse. For greater flexibility, the activation button can be a pneumatic button connected to the movement mechanism via an air pipe.

Activation button can have an activation rod and second part of retrievable tip mechanism is a movement button, where as part of activation, the activation rod presses the movement button, while the axis of the activation rod and movement button axis may not be aligned, or be placed at different angles. The movement button can be represented by an electrical push-button placed on the Printed Circuit Board (PCB), having a disk for making electrical contact with other elements on the PCB and also used as a retrieving spring, where the disk has a hole in the middle, and the movement rod passes through the middle hole of the disk to transfer the press movement to the other side of the PCB to the retrievable tip mechanism.

This disk is making contact between contact plated, one located in the middle of button and other or others located on the side(s) of button. The middle contact should be in form of ring instead of circle in typical electrical mini pushbutton.

A method used for improving the detection of rotational movement for a computer mouse for precision control over working surfaces having a top with an upper surface for placing the user's hand when moving the mouse over working surfaces, a base with a bottom surface equipped with cushion members with slid-able sheets configured for sliding across the working surfaces, a movement detection sensor for measuring the computer mouse movement over the working surface and navigating a pointer to different directions, and a tip with a base, which can be placed on the bottom surface or penetrate the bottom surface, where the base is not extended beyond the cushion members to avoid touching the working surfaces and the tip is extended beyond the cushion members to provide a resistance point during mouse movement over the working surface, wherein the resistance point provides precise movement of the mouse over the work surface without affecting the position and navigation of the pointer on a computer screen, the method includes:

Providing two modes of operation: one for regular operation and one for rotational operation;
Switching between the two modes based on a predefined trigger;
Measuring movement of the computer mouse over the working surface using the movement detection sensor; and
Interpreting specific predefined movements as regular in regular mode of operation and as rotational in rotational mode of operation.

This method can be implements by using electrical switch wherein the predefined trigger is an electrical signal submitted in response to user action when the tip is providing a resistance point.

The other implementation is by using pressure of force sensor, wherein the predefined trigger is a pressure signal submitted when pressure on the tip exceeds a predefined pressure threshold as detected by a pressure detection sensor. For example, if force exceeds 2 kg, electronic trigger captures this value and changing his state and sending signal, in response software switching between modes of operation.

The other implementation is by using the movement detection sensor comprises two optical sensors located in different locations on the bottom surface, and the predefined trigger is a predefined ratio between the movements detected by each of the optical sensors. The predefined trigger relies on a predefined ratio between the movements detected by each of the optical sensors. When a user rotates the mouse with the tip as the base point, the first optical sensor reads an arc with one radius, while the second optical sensor reads an arc with another radius. The ratio between these two radii identifies that the user is performing a rotation around the tip.

BRIEF DESCRIPTION OF THE DRAWINGS

Reference will be made in detail to preferred embodiments disclosed herein, examples of which may be illustrated in the accompanying figures. The figures are intended to be illustrative, not limiting. Although the invention is generally described in the context of these preferred embodiments, it should be understood that it is not intended to limit the spirit and scope disclosed herein to these particular embodiments. The structure, operation, and advantages of the present preferred embodiment disclosed herein will become further apparent upon consideration of the following description, taken in conjunction with the accompanying figures, wherein.

DETAILED DESCRIPTION OF THE DRAWINGS

Figure 1:
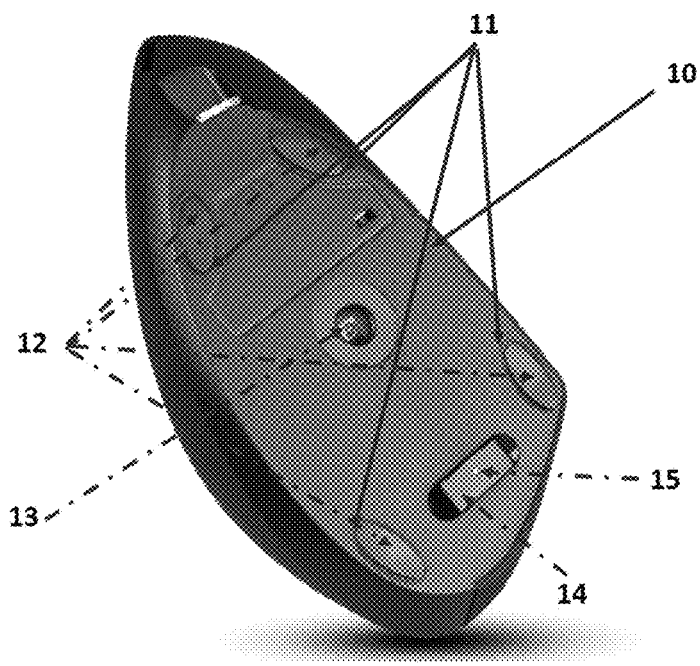
FIG. 1 is a Computer mouse with bottom surface resistance point.

FIG. 1 shows computer mouse with bottom surface resistance point. 10 is mouse bottom. 11 are bottom surface cushion members, 12 are slid-able sheets configured for sliding across the working surfaces. 13 is movement detection sensor for measuring the computer mouse movement over the working surface and navigating a pointer to different directions. 14 is base for tip. 15 is tip. Base with tip is located in the area between slid-able sheets 12. Tip is extended beyond the slid-able sheets; it is touching working surface and providing resistance point, wherein the resistance point provides precise movement of the mouse over the work surface without affecting the position and navigation of the pointer on a computer screen.

Figure 2:
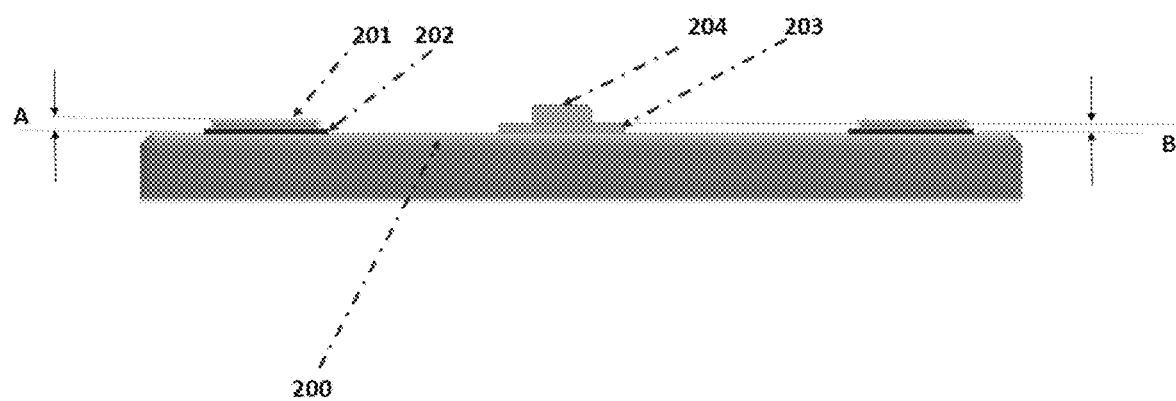
FIG. 2 is a Computer mouse bottom detail.

FIG. 2 shows computer mouse bottom detail. 200 is mouse bottom, 201 is bottom slid-able sheet. 202 is bottom surface cushion member. 203 is base for tip. 204 is tip.

Height of base for tip 203 over mouse bottom 200 marked "B" is less or equal to height of slid-able sheet 201 over mouse bottom 200 marked "A".

Figure 3:
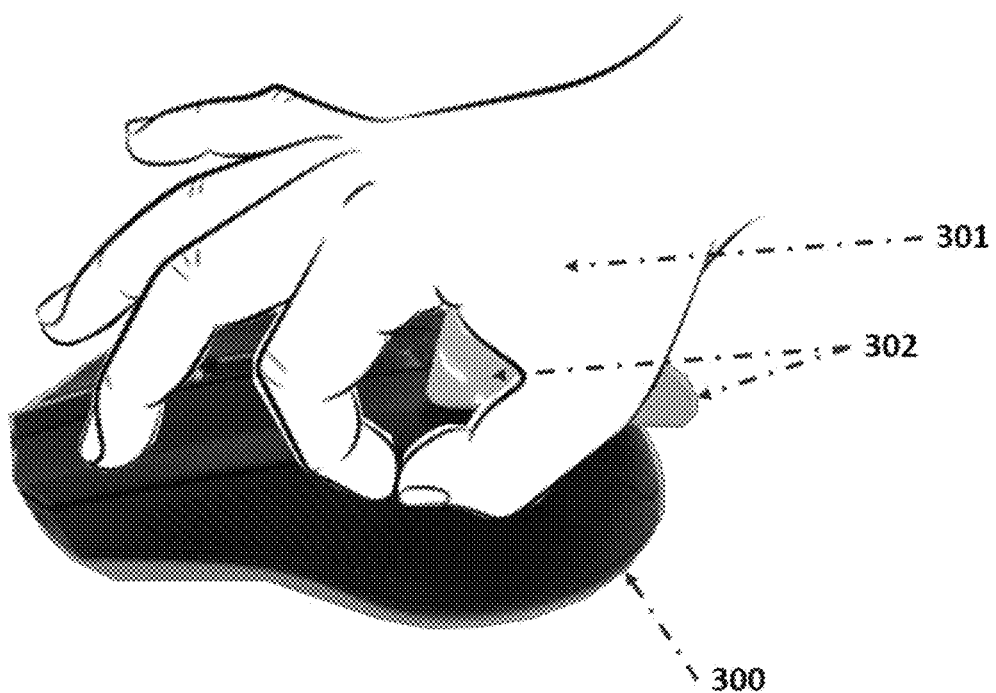
FIG. 3 is Computer mouse with a palm button embodiment.

FIG. 3 shows computer mouse with palm button embodiment. 300 is computer mouse. 301 is user palm. 302 is palm button. The palm button 302 is placed on the upper surface under the user palm 301. For activation user is pressing button with palm, without using the fingers. Pressing palm button cause tip movement in to working position, creating resistance.

When user rising his palm 310 button 302 returns in to initial position. The palm button 302 is raised or sticking upwards over the upper surface of computer mouse 300 to reduce the required distance the palm must travel for activation.

Figure 4:
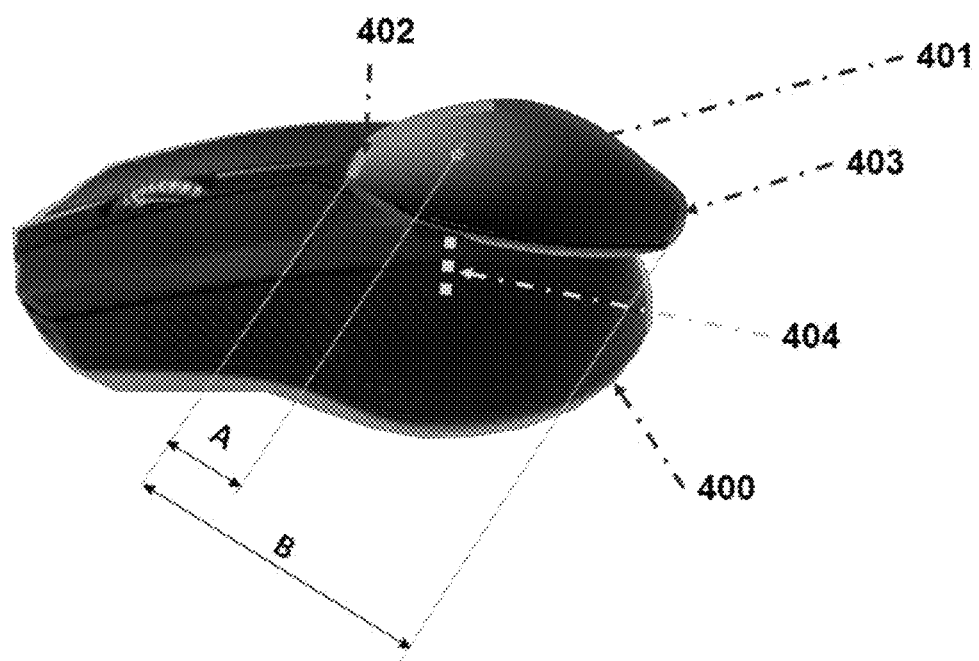
FIG. 4 is Computer mouse with a palm button embodiment.

FIG. 4 shows computer mouse with palm button embodiment. 400 is computer mouse. 401 is palm button. 402 is fixed side of palm button 401. 403 is free side of palm button 401. 404 is shaft connected to button 401, transmitting movement to tip. Button 401 is flexible, when user is pressing free side 403 it is moving downwards, distance from fixed side 402 to connection of shaft 404 marked "A" is less than distance from fixed side 402 to free side 403 marked "B". Ratio of shaft 404 traveling to free side 403 traveling equals A/B, that, allowing more granular control over the activation.

Figure 5:
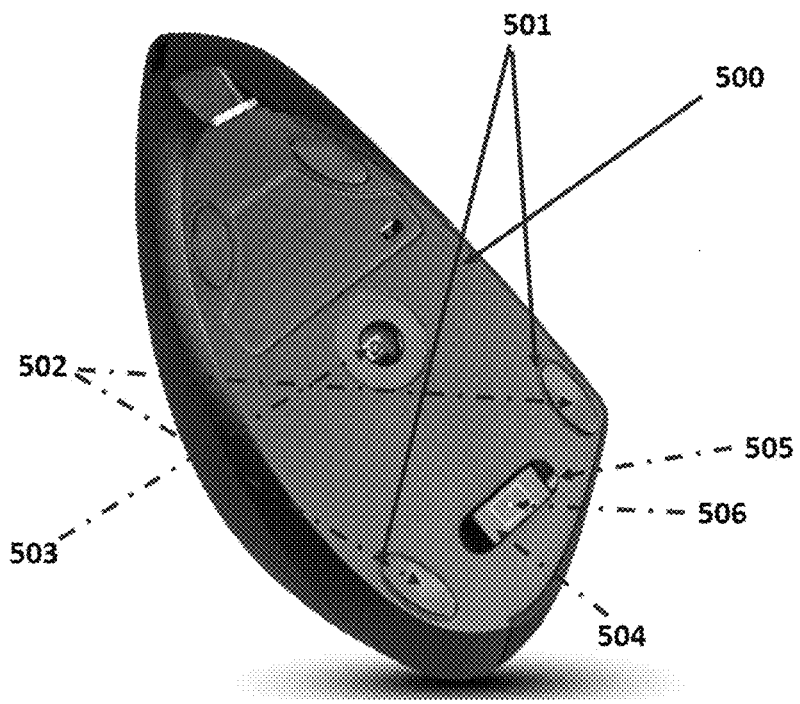
FIG. 5 is Computer mouse with a base is in the form of a sticker embodiment.

FIG. 5 shows of Computer mouse with a base is in the form of a sticker embodiment. 500 is computer mouse. 501 are bottom surface cushion members, 502 are slid-able sheets configured for sliding across the working surfaces. 503 is movement detection sensor for measuring the computer mouse movement over the working surface and navigating a pointer to different directions. 504 is base for tip. 505 is hollow housing unit. 506 is tip. Base 504 with tip 506 is located in the area between slid-able sheets 502. Tip 506 with a base 504 is an external removable part, can be easily removed from housing unit 505. The hollow housing unit 505 can be the USB dongle holder.

Figure 6:
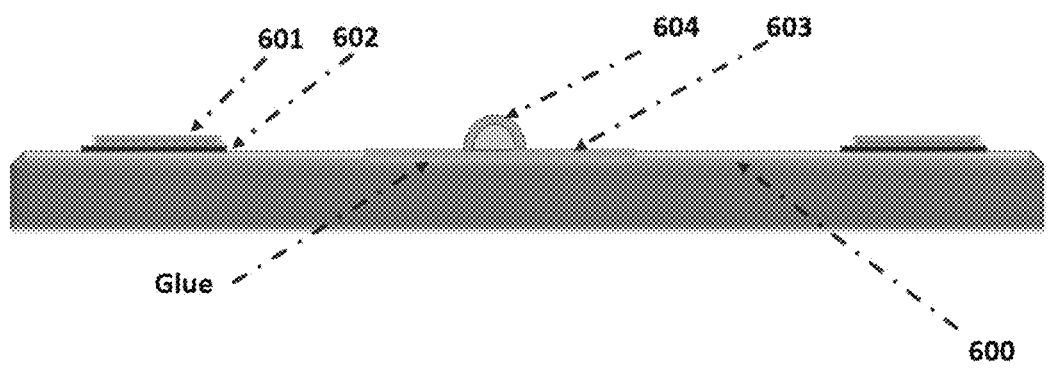
FIG. 6 is Computer mouse with a base is in the form of a sticker detail.

FIG. 6 shows computer mouse with a base is in the form of a sticker detail. 600 is computer mouse. 602 are bottom surface cushion member, 601 are slid-able sheet. 604 is pressure sensor represented by force-dependent resistor or RFID passive sensor tag. 603 is tip.

Sensor 604 is attached to base by adhesive. Sensor 604 with tip 603 forming sticker that can be removable or non-removable.

Figure 7:
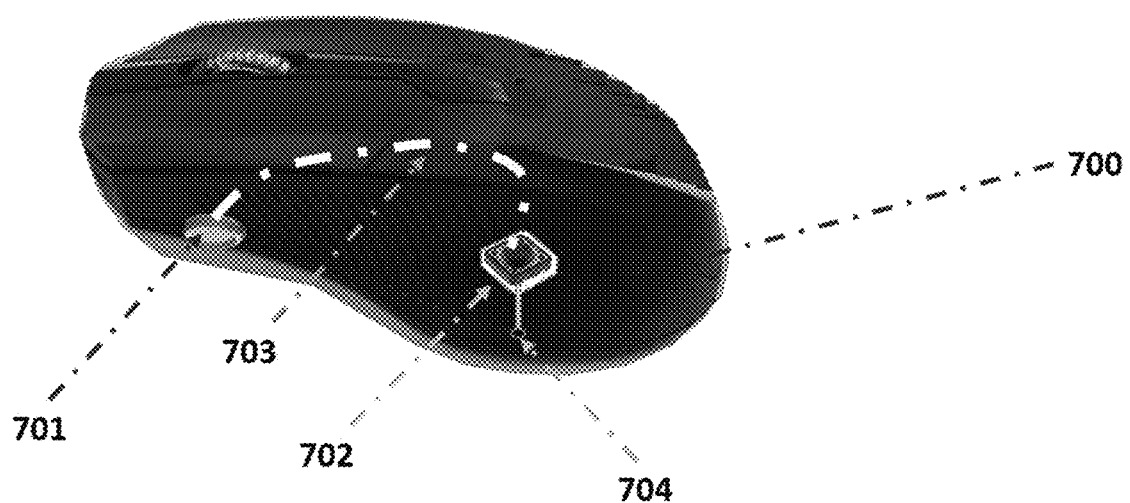
FIG. 7 is Computer mouse with two parts retrievable tip mechanism embodiment.

FIG. 7 shows computer mouse with two parts retrievable tip mechanism embodiment. 700 is computer mouse. 701 is activation button represented by mechanical button or pneumatic button. 702 is movement mechanism. 703 is pull-push cable if 701 is mechanical button or air pipe if 701 is pneumatic button. 704 is tip. Connection to movement mechanism 702 can be flexible if available inner space does not allow rigorous connection. Pull-push cable 703 proving certain degree of flexibility, when more flexibility needed activation button can be pneumatic button.

When user activated button 701 movement transmitted to 702, which moving tip 704 in to working position.

Figure 8:
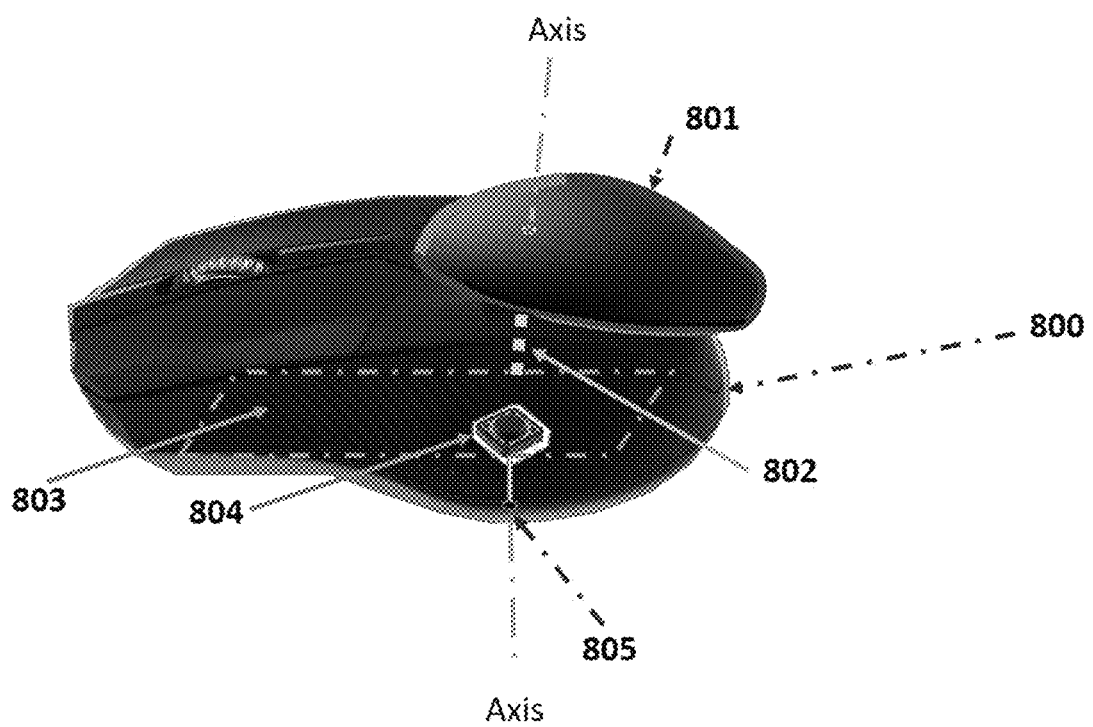
FIG. 8 is Computer mouse with two parts retrievable tip mechanism embodiment.

FIG. 8 shows computer mouse with two parts retrievable tip mechanism embodiment. 800 is computer mouse. 801 is activation button. 802 is activation rod. 803 is Printed Circuit Board (PCB). 804 is movement button. 805 is tip. When user pressed activation button 801, activation rod 802 presses the movement button 804, which transfer movement downwards, which cause tip 805 to move in to working position. The axis of the activation rod and movement button axis may not be aligned, or be placed at different angles. At retrieved position activation rod 802, may not touch movement button. Preferably, movement button 804 is electrical mini pushbutton placed on PCB 803.

Figure 9:
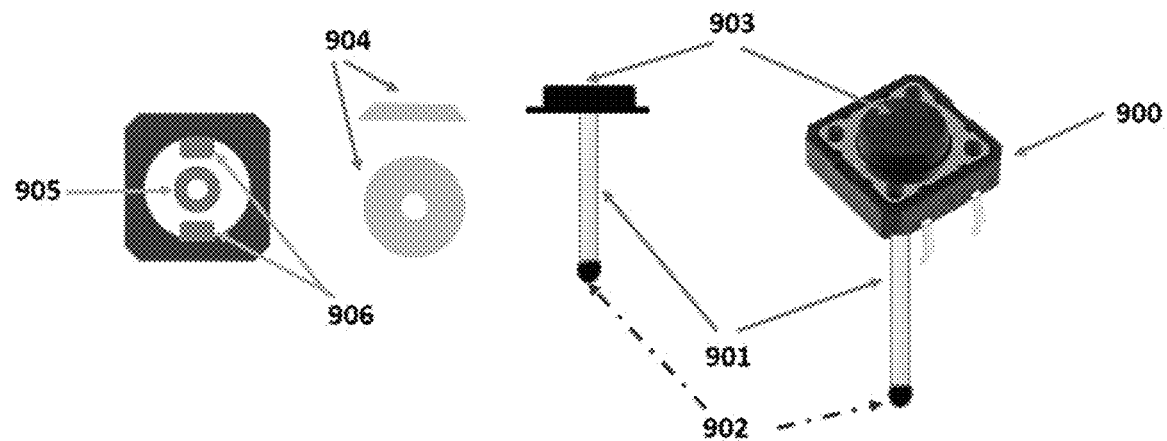
FIG. 9 is a Computer mouse with two parts retrievable tip mechanism detail.

FIG. 9 shows computer mouse with two parts retrievable tip mechanism detail. 900 is electrical mini pushbutton. 901 is rod. 902 is tip. 903 is cap of button. 904 is contact disk. 905 is electrical middle contact. 906 is side electrical contacts. Disk 904 is used for making electrical contact between contacts 905 and 906. Rod 901 with tip 902 at the bottom is connected to cap 903. Rod passes through hole in disk 904 and another hole in middle contact 905. Movement applied to cap 903 is transferred downwards to tip 902.

Figure 10:
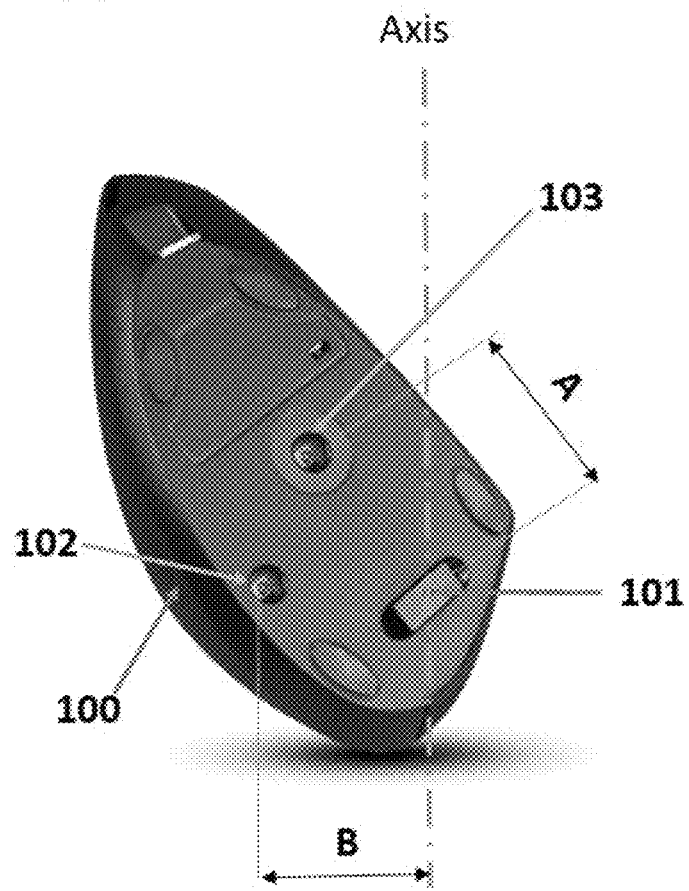
FIG. 10 is Implementation of mouse with two optical sensors.

FIG. 10 shows implementation of mouse with two optical sensors. 100 is computer mouse. 101 is tip. 102 is first optical sensor. 103 is second optical sensor. When user is making rotation with tip 101 as base point first optical sensor 102 will read arc with one radius marked "B", second optical sensor 103 will read arc with other radius marked "A". The ratio A/B between first and second radius identifying that user is performing rotation around tip. Sensors 102 and 103 may be placed at different locations at mouse bottom.

The invention claimed is:

1. A computer mouse for precision control over working surfaces, the mouse comprising:
    a top with an upper surface for placing a user's hand when moving the mouse over working surfaces;
    a base with a bottom surface equipped with cushion members with slidable sheets configured for sliding across the working surfaces;
    a movement detection sensor for measuring the computer mouse movement over the working surface and navigating a pointer to different directions;
    a tip with a base placed on the bottom surface or penetrate the bottom surface, where the base is not extended beyond the cushion members to avoid touching the working surfaces, and the tip is extended beyond the cushion members to provide a resistance point during mouse movement over the working surface,
    wherein the resistance point provides precise movement of the mouse over the work surface without affecting the position and navigation of the pointer on a computer screen.

2. The computer mouse of claim 1, further comprising a retrievable tip mechanism on which the tip with the base is placed, wherein the retrievable tip mechanism, upon activation, retrieves the base with the tip to be placed on the bottom surface or penetrate the bottom surface and provide the resistance point over the working surfaces.

3. The computer mouse of claim 2, further comprising a button for activation of the retrievable tip mechanism.

4. The computer mouse of claim 3, wherein the button is a palm button placed on the upper surface under the palm, enabling activation using the palm without using the fingers.

5. The computer mouse of claim 4, wherein the palm button is raised or sticking upwards over the upper surface to reduce the required distance that the palm travels for activation.

6. The computer mouse of claim 4, wherein the palm button has one side fixed to the mouse top while the other is flexible and raised over the top to allow pressing with the palm, and a button activation mechanism placed in different locations between the two sides, wherein the proximity of the button activation mechanism to the fixed side reduces the pressure it receives from the palm, allowing more granular control over the activation.

7. The computer mouse of claim 1, wherein the tip with the base is an external removable part placed on the bottom surface or into a hollow housing unit extending from the bottom surface.

8. The computer mouse of claim 7, wherein the tip with the base is part of a plug placed into the hollow housing unit extending from the bottom surface.

9. The computer mouse of claim 8, wherein the hollow housing unit is a USB dongle holder.

10. The computer mouse of claim 7, wherein the tip with the base is in the form of a sticker placed using adhesive on the bottom surface or on top of the plug placed into the hollow housing unit extending from the bottom surface.

11. The computer mouse of claim 10, wherein the base of the tip includes a pressure sensor.

12. The computer mouse of claim 11, wherein the pressure sensor is a force-dependent resistor or a RFID passive sensor tag.

13. The computer mouse of claim 3, wherein activation of the retrievable tip mechanism further comprises two parts, an activation button located on the upper surface and a movement mechanism connected to the retrievable tip mechanism.

14. The computer mouse of claim 13, wherein the two parts are connected by a pull-push cable or an air pipe.

15. The computer mouse of claim 13, wherein the activation button further comprises an activation rod and the movement mechanism further comprises a movement button, wherein as part of activation, the activation rod presses the movement button, while axis of the activation rod and the movement button placed at different angles.

16. The computer mouse of claim 15, further comprising a PCB, and the movement button-an electrical push-button placed on the PCB, having a disk for making electrical contact with other elements on the PCB and as a retrieving spring, where the disk has a hole in the middle, and the rod passes through the middle hole of the disk to transfer the press movement to the other side of the PCB to the retrievable tip mechanism.

17. A method for improving detection of rotational movement for a computer mouse for precision control over working surfaces, the computer mouse having a top with an upper surface for placing a user's hand when moving the mouse over working surfaces, a base with a bottom surface equipped with cushion members with slidable sheets configured for sliding across the working surfaces, a movement detection sensor for measuring the computer mouse movement over the working surface and navigating a pointer to different directions, and a tip with a base placed on the bottom surface or penetrate the bottom surface, where the base is not extended beyond the cushion members to avoid touching the working surfaces and the tip is extended beyond the cushion members to provide a resistance point during mouse movement over the working surface, wherein the resistance point provides precise movement of the mouse over the work surface without affecting the position and navigation of the pointer on a computer screen, the method comprising:

providing two modes of operation: one for regular operation and one for rotational operation;

switching between the two modes based on a predefined trigger;

measuring movement of the computer mouse over the working surface using the movement detection sensor; and interpreting specific predefined movements as regular in regular mode of operation and as rotational in rotational mode of operation.

18. The method of claim 17, wherein the predefined trigger is an electrical signal submitted in response to user action when the tip is providing a resistance point.

19. The method of claim 17, wherein the predefined trigger is a pressure signal submitted when pressure on the tip exceeds a predefined pressure threshold as detected by a pressure detection sensor.

20. The method of claim 17, wherein the movement detection sensor comprises two optical sensors located in different locations on the bottom surface, and the predefined trigger is a predefined ratio between the movement detected by each of the optical sensors.

\* \* \* \* \*